US011828370B2

(12) United States Patent
Patterson

(10) Patent No.: US 11,828,370 B2
(45) Date of Patent: Nov. 28, 2023

(54) CHECK VALVE WITH CONFORMING SEAT

(71) Applicant: Proserv Gilmore Valve LLC, Houston, TX (US)

(72) Inventor: Andy Patterson, Katy, TX (US)

(73) Assignee: Proserv Gilmore Valve LLC, Houston, TX (US)

( * ) Notice: Subject to any disclaimer, the term of this patent is extended or adjusted under 35 U.S.C. 154(b) by 0 days.

(21) Appl. No.: 17/138,144

(22) Filed: Dec. 30, 2020

(65) Prior Publication Data

US 2021/0207726 A1    Jul. 8, 2021

Related U.S. Application Data

(60) Provisional application No. 62/956,397, filed on Jan. 2, 2020.

(51) Int. Cl.
*F16K 15/02*     (2006.01)
*F16K 31/06*     (2006.01)
*F16K 1/42*      (2006.01)

(52) U.S. Cl.
CPC .............. *F16K 15/026* (2013.01); *F16K 1/42* (2013.01); *F16K 31/0655* (2013.01)

(58) Field of Classification Search
CPC ........................................................ F16K 1/42
USPC ................................................ 251/359, 63.5
See application file for complete search history.

(56) References Cited

U.S. PATENT DOCUMENTS

| 402,600 A | 5/1889 | Kemp |
|---|---|---|
| 1,654,642 A | 1/1928 | Geissinger |
| 2,140,735 A | 12/1938 | Gross |
| 2,311,851 A | 2/1943 | McClure |
| 2,560,841 A | 7/1951 | Bishop |
| 2,605,108 A | 7/1952 | Stephens |

(Continued)

FOREIGN PATENT DOCUMENTS

| CH | 469928 A | 3/1969 |
|---|---|---|
| DE | 102014224979 A1 | 6/2016 |

(Continued)

OTHER PUBLICATIONS

PCT International Search Report and Written Opinion dated Dec. 1, 2017, for International Application No. PCT/US2017/061567.

(Continued)

*Primary Examiner* — Robert K Arundale
(74) *Attorney, Agent, or Firm* — Patterson + Sheridan, LLP

(57) ABSTRACT

A valve includes a valve body including a first fluid, a second fluid port, and an interior passage fluidly connecting the first and second fluid ports, a bore extending inwardly of the valve body and terminating in an annular first seat securement surface extending around the interior passage, the second fluid port fluidly connected to the bore, a cage disposed in the bore, the cage having an annular second seat securement surface and an opposed first annular surface, the annular second seat securement surface facing the annular first seat securement surface, a cover extending over the first wall of the valve body and including a cage engagement surface contacting the first annular surface, and an annular seat having a main body having an opening therethrough and comprising a first annular region having a first elevation and a second annular region having a second elevation different than the first annular region.

10 Claims, 9 Drawing Sheets

(56) References Cited

U.S. PATENT DOCUMENTS

| | | |
|---|---|---|
| 2,685,296 A | 8/1954 | Boosman |
| 2,729,226 A | 1/1956 | Jones |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |
| 2,867,463 A | 1/1959 | Snider |
| 2,892,644 A | 6/1959 | Collins |
| 2,906,290 A | 9/1959 | Harding et al. |
| 2,973,746 A | 3/1961 | Jupa |
| 3,022,794 A | 2/1962 | Pippenger |
| 3,114,391 A | 12/1963 | Kurtz |
| 3,145,723 A | 8/1964 | Chorkey |
| 3,189,049 A | 6/1965 | Carlson |
| 3,219,060 A | 11/1965 | Pearl et al. |
| 3,225,786 A | 12/1965 | Elliott |
| 3,279,805 A | 10/1966 | Quinson |
| 3,316,930 A | 5/1967 | Garduer |
| 3,352,394 A | 11/1967 | Longshore |
| 3,421,533 A | 1/1969 | Conn |
| 3,474,828 A | 10/1969 | Wheeler et al. |
| 3,485,225 A | 12/1969 | Bailey et al. |
| 3,533,431 A | 10/1970 | Kuenzel et al. |
| 3,536,085 A | 10/1970 | Taplin |
| 3,540,695 A | 11/1970 | Taylor |
| 3,587,647 A | 6/1971 | Walters |
| 3,598,148 A | 8/1971 | Kroffke |
| 3,635,436 A | 1/1972 | Tillman |
| 3,662,950 A | 5/1972 | McIntosh et al. |
| 3,683,694 A | 8/1972 | Granberg |
| 3,749,122 A | 7/1973 | Gold |
| 3,797,525 A | 3/1974 | Lieser |
| 3,913,620 A | 10/1975 | Pauliukonis |
| 3,949,645 A | 4/1976 | Masclet |
| 3,978,888 A | 9/1976 | Naono |
| 4,220,174 A | 9/1980 | Spitz |
| 4,240,634 A | 12/1980 | Wiczer |
| 4,253,481 A | 3/1981 | Sarlls, Jr. |
| 4,263,938 A | 4/1981 | Peters |
| 4,281,677 A | 8/1981 | Hoffman |
| 4,336,946 A | 6/1982 | Wheeler |
| 4,396,071 A | 8/1983 | Stephens |
| 4,444,216 A | 4/1984 | Loup |
| 4,457,489 A | 7/1984 | Gilmore |
| 4,475,568 A | 10/1984 | Loup |
| 4,491,154 A | 1/1985 | Peters |
| 4,493,335 A | 1/1985 | Watson |
| 4,554,940 A | 11/1985 | Loup |
| 4,793,590 A | 12/1988 | Watson |
| 4,856,557 A | 8/1989 | Watson |
| 4,877,057 A | 10/1989 | Christensen |
| 4,890,645 A | 1/1990 | Andersen |
| 4,968,197 A | 11/1990 | Chen |
| 5,035,265 A | 7/1991 | Chen |
| 5,069,240 A | 12/1991 | Kurkjian, Jr. |
| 5,190,078 A | 3/1993 | Stoll et al. |
| 5,222,521 A | 6/1993 | Kihlberg |
| 5,301,637 A | 4/1994 | Blount |
| 5,771,931 A | 6/1998 | Watson |
| 5,771,993 A | 6/1998 | Anderson et al. |
| 5,778,918 A | 7/1998 | McLelland |
| 5,797,431 A | 8/1998 | Adams |
| 5,901,749 A | 5/1999 | Watson |
| 6,041,804 A | 3/2000 | Chatufale |
| 6,257,268 B1 | 7/2001 | Hope et al. |
| 6,264,206 B1 | 7/2001 | Hashizawa et al. |
| 6,296,008 B1 | 10/2001 | Boyer et al. |
| 6,318,400 B1 | 11/2001 | Hope et al. |
| 6,382,256 B2 | 5/2002 | Kim et al. |
| 6,520,478 B1 | 2/2003 | Hope et al. |
| 6,523,613 B2 | 2/2003 | Rayssiguier et al. |
| 6,651,696 B2 | 11/2003 | Hope et al. |
| 6,668,861 B2 | 12/2003 | Williams |
| 6,702,024 B2 | 3/2004 | Neugebauer |
| 6,843,266 B2 | 1/2005 | Hope et al. |
| 6,901,960 B2 | 6/2005 | Roberts et al. |
| 6,983,803 B2 | 1/2006 | Watson et al. |
| 7,000,890 B2 | 2/2006 | Bell et al. |
| 7,073,590 B2 | 7/2006 | Neugebauer et al. |
| 7,159,605 B2 | 1/2007 | Thrash, Jr. et al. |
| 7,428,913 B2 | 9/2008 | Benson |
| 7,438,086 B2 | 10/2008 | Bento et al. |
| 7,520,297 B2 | 4/2009 | Bell et al. |
| 7,628,170 B2 | 12/2009 | Kok-Hiong et al. |
| 7,784,553 B2 | 8/2010 | Moreno |
| 7,959,161 B2 | 6/2011 | Seki et al. |
| 8,052,119 B2 | 11/2011 | Numazaki et al. |
| 8,245,729 B2 | 8/2012 | Zub |
| 8,246,055 B2 | 8/2012 | Asplund et al. |
| 8,342,202 B2 | 1/2013 | Nishio et al. |
| 8,397,742 B2 | 3/2013 | Thrash et al. |
| 8,408,244 B2 | 4/2013 | Gilcher |
| 8,453,678 B2 | 6/2013 | Neff et al. |
| 8,469,059 B1 | 6/2013 | Forst |
| 8,474,792 B2 | 7/2013 | Kubo et al. |
| 8,490,652 B2 | 7/2013 | Bohaychuk et al. |
| 8,627,893 B2 | 1/2014 | Otto et al. |
| 9,121,244 B2 | 9/2015 | Loretz et al. |
| 9,133,944 B2 | 9/2015 | Haeckel et al. |
| 9,297,462 B2 | 3/2016 | Hattori et al. |
| 9,334,946 B1 | 5/2016 | Mason |
| 9,354,638 B2 | 5/2016 | Rebreanu et al. |
| 9,423,031 B2 | 8/2016 | Weintraub et al. |
| 9,719,600 B2 | 8/2017 | Patterson |
| 9,874,282 B2 | 1/2018 | Wetzel et al. |
| 10,012,325 B2 | 7/2018 | Bohaychuk et al. |
| 11,041,358 B2 | 6/2021 | Jones et al. |
| 2004/0047748 A1 | 3/2004 | Roberts et al. |
| 2004/0173976 A1 | 9/2004 | Boggs |
| 2004/0262007 A1 | 12/2004 | Neugebauer et al. |
| 2005/0028864 A1 | 2/2005 | Thrash et al. |
| 2005/0067031 A1 | 3/2005 | Lee |
| 2006/0137744 A1 | 6/2006 | Anastas |
| 2006/0237064 A1 | 10/2006 | Benson |
| 2007/0000544 A1 | 1/2007 | Thompson |
| 2007/0069576 A1 | 3/2007 | Suzuki |
| 2007/0113906 A1 | 5/2007 | Sturman et al. |
| 2010/0044605 A1 | 2/2010 | Veilleux |
| 2010/0140881 A1 | 6/2010 | Matsuo |
| 2010/0154896 A1 | 6/2010 | Thrash, Jr. et al. |
| 2010/0243084 A1 | 9/2010 | Yoshioka et al. |
| 2011/0253240 A1 | 10/2011 | Otto et al. |
| 2012/0248358 A1 | 10/2012 | Pic et al. |
| 2012/0292550 A1 | 11/2012 | Meek |
| 2013/0032222 A1 | 2/2013 | Bresnahan |
| 2013/0037736 A1 | 2/2013 | Bresnahan |
| 2013/0146303 A1 | 6/2013 | Gustafson |
| 2013/0181154 A1 | 7/2013 | Robison et al. |
| 2013/0220441 A1* | 8/2013 | Zanettacci ............... F16T 1/14 137/183 |
| 2014/0116551 A1 | 5/2014 | Smith |
| 2014/0377111 A1 | 12/2014 | Bagagli et al. |
| 2015/0060715 A1 | 3/2015 | Hoang |
| 2015/0152959 A1 | 6/2015 | Mangiagli et al. |
| 2015/0191996 A1 | 7/2015 | Weintraub |
| 2015/0191997 A1 | 7/2015 | Weintraub et al. |
| 2015/0276072 A1 | 10/2015 | Rebreanu et al. |
| 2015/0276083 A1 | 10/2015 | Druhan et al. |
| 2015/0362083 A1* | 12/2015 | Patterson ............ F15B 13/028 137/12 |
| 2015/0369002 A1 | 12/2015 | Patterson |
| 2016/0103456 A1 | 4/2016 | Cho et al. |
| 2016/0123478 A1 | 5/2016 | Wetzel et al. |
| 2016/0230900 A1 | 8/2016 | Schulz et al. |
| 2016/0258531 A1 | 9/2016 | Ito et al. |
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1 | 6/2017 | Huynh et al. |
| 2017/0189730 A1 | 7/2017 | Ernfjall |
| 2017/0220054 A1 | 8/2017 | Zhu et al. |
| 2017/0241563 A1 | 8/2017 | Simpson |
| 2017/0260831 A1 | 9/2017 | Green |

(56) References Cited

U.S. PATENT DOCUMENTS

| | | | |
|---|---|---|---|
| 2017/0314689 A1 | 11/2017 | Osterbrink et al. | |
| 2017/0370481 A1 | 12/2017 | Glazewski | |
| 2018/0073652 A1 | 3/2018 | Weintraub | |
| 2020/0096114 A1 | 3/2020 | Stetzer et al. | |
| 2020/0124181 A1* | 4/2020 | Liu | F16K 1/36 |

FOREIGN PATENT DOCUMENTS

| | | | |
|---|---|---|---|
| DE | 102018107053 A1 | 10/2018 | |
| JP | 2019086086 A | 6/2019 | |
| KR | 20050045760 A | 5/2005 | |

OTHER PUBLICATIONS

PCT International Search Report and Written Opinion dated Jan. 31, 2018, for International Application No. PCT/US2017/051550.

PCT International Search Report and Written Opinion dated Jun. 23, 2015, for International Application No. PCT/US2014/062114.

PCT International Search Report and Written Opinion dated Nov. 14, 2019, for International Application No. PCT/US2019/046323, 13 pages.

PCT/US2020/067625, International Search Report and Written Opinion dated May 4, 2021, 15 pages.

PCT/US2021/044762, International Search Report and Written Opinion dated Oct. 27, 2021, 12 pages.

PCT/US2021/063521, International Search Report and Written Opinion dated Feb. 14, 2022, 20 pages.

India Application No. 2021137010322, Examination Report dated Jun. 5, 2021, 6 pages.

Indian Application No. 202217042243, Examination Report dated Feb. 7, 2023, 7 pages.

European Patent Application No. 20853585.6, Office Action dated Sep. 5, 2023, 6 pages.

* cited by examiner

CHECK VALVE WITH CONFORMING SEAT

CROSS-REFERENCE TO RELATED APPLICATIONS

This application claims benefit of U.S. provisional patent application Ser. No. 62/956,397, filed Jan. 2, 2020, which is herein incorporated by reference.

BACKGROUND

Field

The present disclosure relates to the field of valves, more particularly to control valves used in fluid based control circuits used to initiate and control the operation of fluid operated control components and other fluid operated components, for example pressure relief and check valves connected to a fluid circuit, the valve configured to move from a closed to an open position and allow fluid in the circuit to pass therethrough, as well as be piloted open to vent a pressure downstream of the valve, i.e., at the valve outlet.

Description of the Related Art

Certain fluid valves, for example a prior check valve 4 as shown in FIGS. 1 and 2, which is used in fluid circuits which control the operation of, or operate, fluid controlled or operated equipment, include a first fluid port 1 functionable as an upstream inlet, a second fluid port 2 functionable as a downstream outlet, and, when the pressure in the first fluid port 1 exceeds a predefined pressure, also known as the "cracking pressure", a recessed annular seal sleeve 3 having a seat contact recessed from the outer circumferential wall thereof actuates to selectively communicate fluid and pressure between the first fluid port and the second fluid port. Thus, the valve 4 can operate as a check valve. In one construct, these valves 4 include a main body 5 having a central bore 6, a counterbore 7 extending inwardly of an outer wall 8 of the main body 5 and terminating at an annular seat face 9, and a cap 10 extending over the outer wall 8 into which the counterbore extends and which seals off the counterbore 7. The cap 10 includes a boss 23 extending inwardly of the counterbore 7 and terminating at a boss face 24. A seat ring 11 is disposed within the counterbore 7 and against the annular seat face 9, and a cage 12 functioning as a cage extends between the boss face 24 of the cap 10 and the seat ring 11. The recessed annular seal sleeve 3 is engaged against the back side 13 of the seat ring 11 opposite to the front side 14 thereof facing the annular seat face 9, and a spring 15 extends between the cap 10 and the recessed annular seal sleeve 3 to bias the recessed annular seal sleeve 3 against the back side 13 of the seat ring 11. The recessed annular seal sleeve 3 faces the portion of the central bore 6 of the body which is fluidly coupled to the first fluid port 1. When the pressure in the first fluid port 1 exceeds the cracking pressure, the recessed annular seal sleeve 3 backs away from the back side 13 of the seat ring 11, and allows fluid and pressure communication between the first fluid port 1 and the second fluid port 2. The seat ring 11 includes a circumferential outer surface 19 generally of the same geometry of the counterbore inner wall 20, into which extends a circumferential seal groove 21 having a seal ring, such as an O-ring 22 therein. The O-ring 22 contacts the base of the circumferential seal groove 21 and the counterbore inner wall 20, and the width of the O-ring 22, and thus of the circumferential seal groove 21, is dictated by the maximum expected pressure difference between the first fluid port 1 and the second fluid port 2, plus a safety factor, over the installed life of the valve 4. The thickness "t" of the annular projections or flanks of the seat ring 11 between the opposed front side 14 or back side 13 of the seat ring 11 and the circumferential seal groove 21 are likewise selected to ensure that the seat ring 11 has sufficient strength to withstand the maximum expected pressure difference between the first fluid port 1 and the second fluid port 2, plus a safety factor without failing and allowing the O-ring 22 to become free of the circumferential seal groove 21 and thereby allow uncontrolled flow of fluid and pressure between the between the first fluid port 1 and the second fluid port 2. Additionally, this requires the seat ring 11 be manufactured of a relatively rigid plastic material, such as Delrin® 511P or a PEEK material.

To ensure that the seat ring 11 is biased against the annular seat face 9 and thereby ensure that the seat ring 11 cannot move when the recessed annular seal sleeve 3 engages it, i.e., there is no free space between the seat ring 11 and the annular seat face 9 or between the seat ring 11 and the cage 12 when the valve is assembled, the cage 12 is sized to bias the seat ring 11 against the annular seat face 9 upon assembly of the valve 4. The seat ring 11 is a solid right annular body, configured to withstand extremes of pressure, and has limited compressibility. To ensure the biasing, the boss 23, and thus boss face 24 on the cap 10, which is connected to the main body 4 by a plurality of fasteners extending through opening therethrough (not shown) and corresponding threaded openings (not shown) into which threaded fasteners are secured, 16 presses an annular face 17 of the cage 12 against the back side 13 of the seat ring 11 and thus presses the seat ring 11 against the annular seat face 9. Because of the machining and fabricating tolerance ranges of the depth of the counterbore 7 from the cap end thereof (where the counterbore begins at outer wall 8 of the main body 5) to the annular seat face 9, and thus the distance between the annular seat face 9 and the outer wall 8 of the main body 5 into which the counterbore 7 extends, as well as the machining and fabricating tolerance range on the height of the cage 12, on the height of the boss 23 and on the thickness of the seat ring 11, to ensure proper loading of the seat ring 11 against the annular seat face 9, a purposefully created tolerance stack gap 18a (FIG. 2) is present between the inner surface 18 of the cap 10 and the adjacent outer surface 8 of the main body 5 surrounding the counterbore 7, i.e., at all ranges of the tolerances of these parts, the tolerance stack gap 18a is present. Without the tolerance stack gap, the valve assembler cannot ensure that the annular face 17 of the cage 12 biases the seat ring 11 against the annular seat face 9 such as when the seat ring 11, cage 12 and height of the boss 23 are at their minimum dimensions and the counterbore 7 is at its maximum depth dimension, but still within allowed dimensional tolerances. Thus, the gap is purposefully present to allow the assembler of the valve to a visual indicator on the exterior of the valve that the seat ring 11 is properly pushed or biased physically annular seat face 9. If the inner surface 18 of the cap 10 is secured against the base of the outer wall 8, one is unsure whether the cage 12 is actually biased against the seat ring 11 and simultaneously biasing the seat ring 11 against the annular seat face 9. As a result, when this tolerance stack gap 18a is present between the inner surface 18 of the cap 10 and the base of the outer wall 8, the ambient fluids around the installed location of the valve 4 are able to enter into the tolerance stack gap, and where the valve is located in a corrosive environment such as an offshore or subsea environment and exposed to seawater, cause corrosion, and eventually, stress corrosion cracking of the cap 10 or valve body 5, resulting in failure of the valve 4 and the need to replace the valve 4. Because the failure of the valve 4 will affect the integrity of the fluid circuit to which it is connected, for example a fluid control circuit for an offshore or subsea blowout preventer, the integrity of the ability to close the rams of the blowout preventer can be affected. Therefore, the valves 4 of this construct may need to be prematurely replaced prior to the expiration of their useful life and well before the onset of stress corrosion cracking, well before the likelihood of valve failure.

SUMMARY

A valve includes a valve body including a first fluid port opening from the valve body, a second fluid port opening from the valve body, and an interior passage selectively fluidly connecting the first fluid port and the second fluid port, a bore extending inwardly of a first wall of the valve body and having an annular first seat securement surface extending around the an interior passage intermediate of the first fluid port and the second fluid port, a cage disposed in the bore, the cage having an annular second seat securement surface and an opposed first annular surface, the annular second seat securement surface facing the annular first seat securement surface, a cover extending over the first wall of the valve body and the opening of the bore thereof, the cover including a cage engagement surface contacting the first annular surface, and an annular seat having a main body having an opening therethrough and a first seat surface facing and contacting the annular first seat securement surface of the valve body and a second seat surface, facing away from the first seat surface, the second seat surface comprising a first annular region having a first elevation and a second annular region different than the first annular region, and the second annular region comprises at least one projection projecting from the seat to an elevation greater than the first elevation and contacting the annular second seat securement surface.

In an additional aspect, a valve includes a valve body including a first fluid port opening from the valve body, a second fluid port opening from the valve body, and an interior passage selectively fluidly connecting the first fluid port and the second fluid port, a bore extending inwardly of a first wall of the valve body and having an annular first seat securement surface extending around the an interior passage intermediate of the first fluid port and the second fluid port, a cage disposed in the bore, the cage having an annular second seat securement surface and an opposed first annular surface, the annular second seat securement surface facing the annular first seat securement surface, a cover extending over the first wall of the valve body and the opening of the bore thereof, the cover including a cage engagement surface contacting the first annular surface, and an annular seat having a main body having an opening therethrough and a first seat surface facing and contacting the annular first seat securement surface of the valve body and a second seat surface, facing away from the first seat surface, the second seat surface comprising a first annular region having a first elevation and a annular seat including a first compression portion and a second compression portion, wherein the first and second compression portions have different compressibility.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
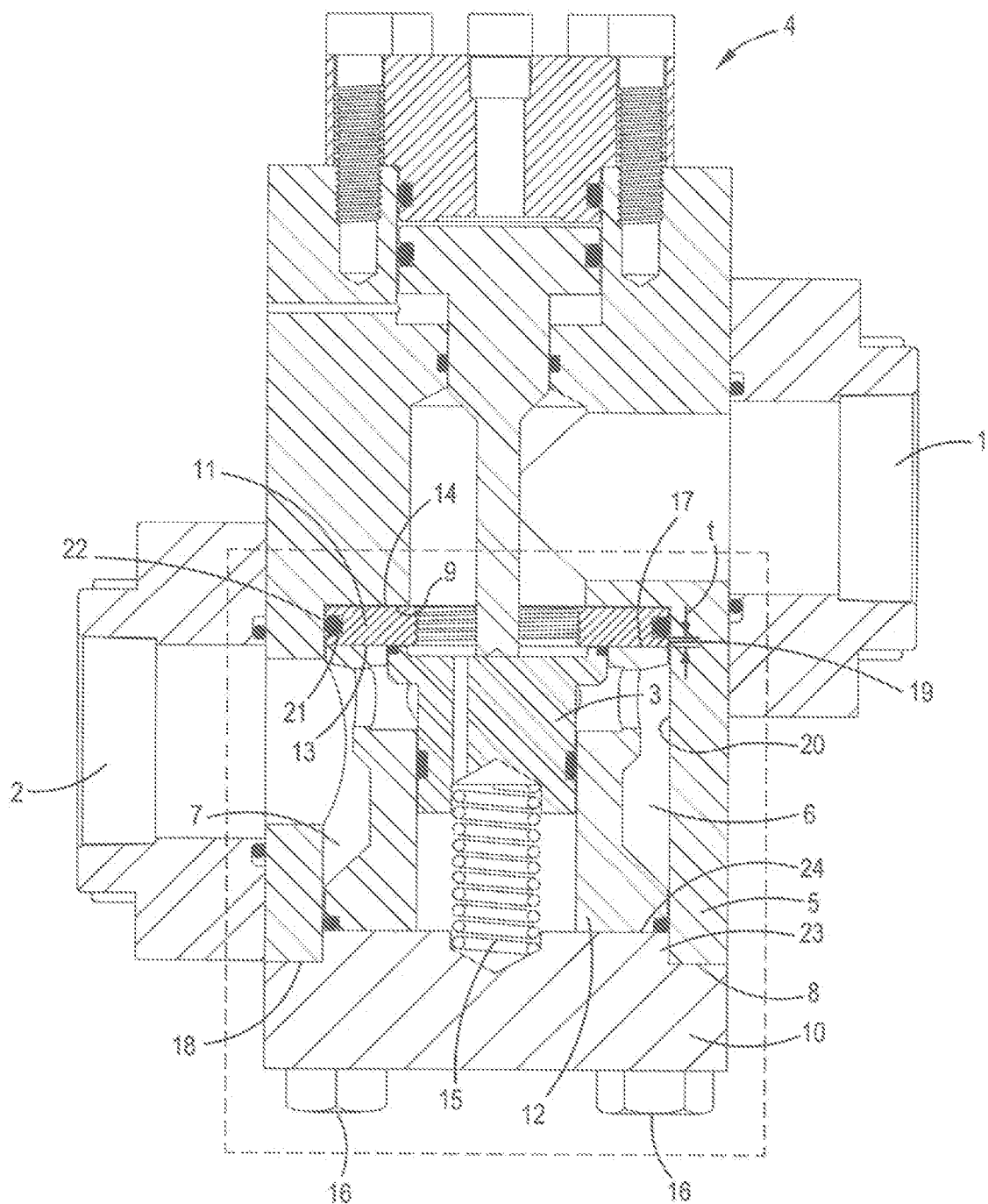
FIG. 1 is a sectional view of a prior art valve operable to open to allow pressure to flow from an inlet to an outlet when the pressure in the inlet exceeds a predetermined pressure value, wherein an intentional physical gap is present between the valve body and the cover.
Figure 2:
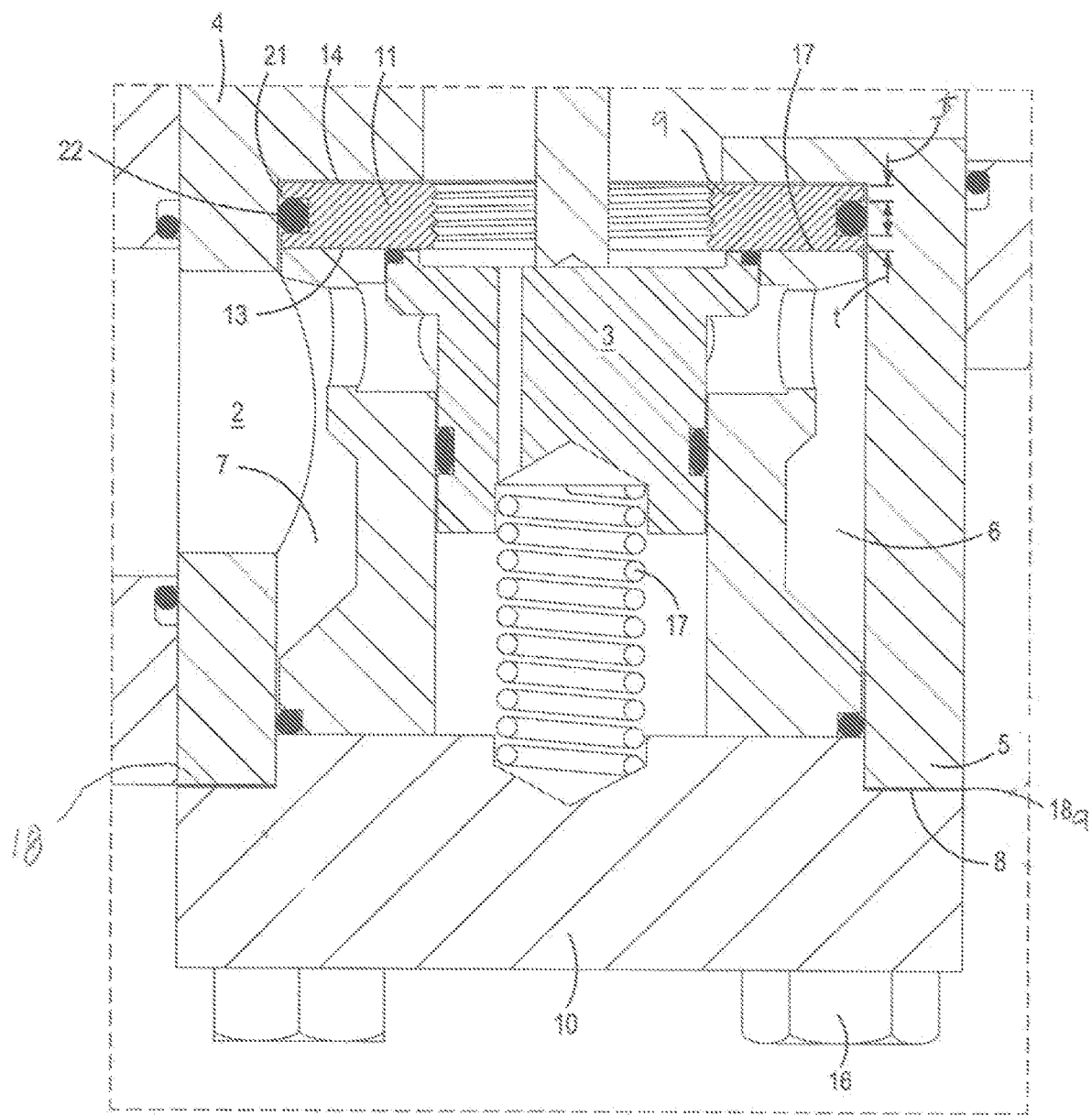
FIG. 2 is an enlarged partial sectional view of the prior art valve of FIG. 1.
Figure 3:
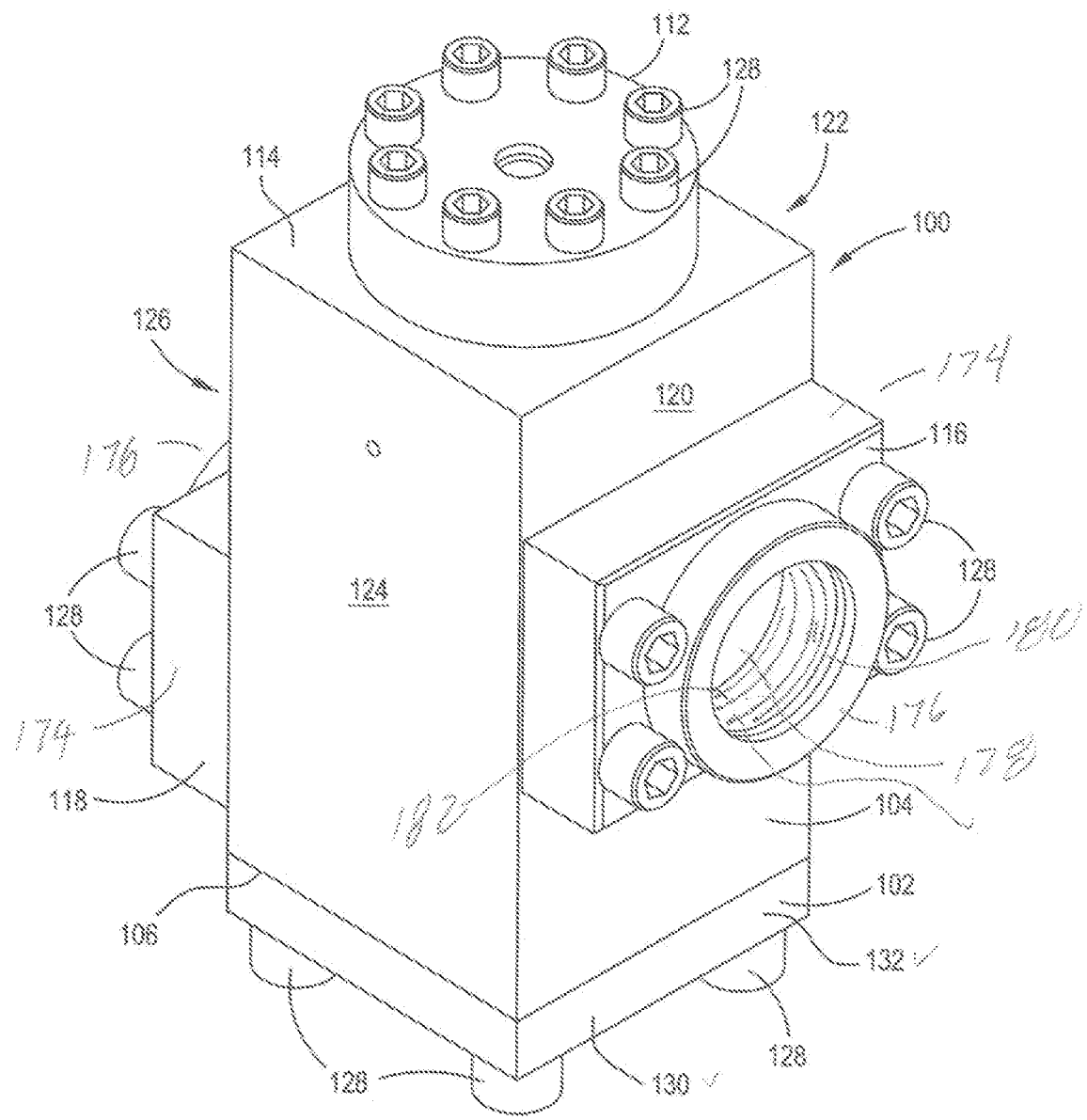
FIG. 3 is an isometric view of the exterior of a non-gapped valve of the present disclosure.

Referring initially to FIG. 3, a valve, here configured as a non-gapped check valve 100 functional as, for example, a pressure relief valve, is provided, wherein the first cover 102 corresponding to the cap 10 of the valve 4 of FIGS. 1 and 2 comes into contact with the adjacent lower cover wall 106 of the body 104 of the non-gapped check valve 100, such that no gap is present between the first cover 102 and the adjacent annular cover wall 106 of the body 104, resulting in reduced corrosion of the components and a longer useable valve lifetime. Here, this capability is provided by use of a conforming seat ring 108 (FIG. 4) having regions of different compressibility. In one aspect, to provide the regions of different compressibility, the conforming seat ring 108 includes a plurality of projections 110 extending therefrom on the side thereof facing away from the annular seat wall 113 (corresponding to the annular seat ledge 9 of valve 4) of the non-gapped check valve 100, which projections 110 are compressible to provide a physical or dimensional relief for the tolerance stack of the valve components, ensuring that the surface of the first cover 102 abuts and contacts the adjacent annular cover wall 106 of the body 104 over the range of the tolerance stack of the interior components of the valve and the cage 210 of the non-gapped check valve 100 is in contact with the conforming seat ring 108, and the conforming seat ring 108 is thus biased into contact with the annular seat wall 113 when the non-gapped check valve 100 is assembled, over the entire range of the dimensional tolerance of the components thereof. The projections 110 may be in a limited annular region or radial span of the cage facing side of the conforming seat ring 108, and thus the conforming seat ring 108 has different compressibility at different annular regions thereof. Additionally, the annular region of lower compressibility may be considered to be at a different elevation of the conforming seat ring 108, i.e., extending outwardly from the annular cap facing surface (second annular face 274) of the conforming set ring, as well as in a different annular region of the annular cap facing surface (second annular face 274) of the conforming seat ring 108.

Figure 5:
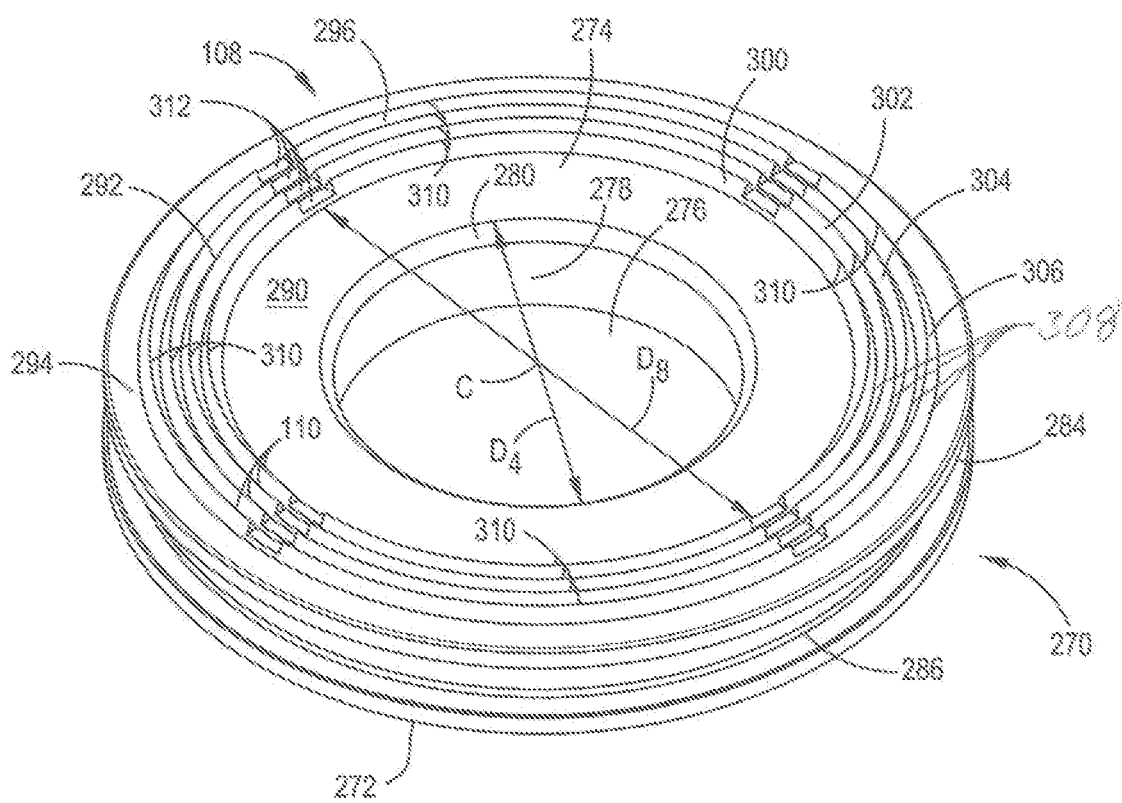
FIG. 5 is an isometric view of a modified seat of the present disclosure.

In one aspect, as shown in FIG. 5, the entire conforming seat ring 108 is composed of the same material having the same material properties, including the projections 110 thereof. However, the projections 110 extend outwardly from the second annular face 274 of the conforming seat ring 108 and are spaced from one another, both radially and, in part, circumferentially, across the second annular face 274. In result, the projections 110, and the open spaces between them, together in aggregate form a region that has greater compressibility, in other words is more readily compressed, than that of the remaining bulk of the conforming seat ring 108. Additionally, the volume or bulk of the projections 110 can, when pressed inwardly of the conforming seat ring 108, deform in a radial direction into the space between the adjacent projections 110 in the radial direction of the conforming seat ring 108 second annular surface 274, and thus have greater compressibility than that of the remaining bulk of the conforming seat ring 108.

Referring to FIG. 3, similarly to the non-gapped check valve 100 of FIGS. 1 and 2, the non-gapped check valve 100 includes the body 104 manufactured, when for subsea service, of for example stainless steel, duplex stainless steel, or CRA (nickel alloy), having a generally rectangular outer contour provided of four generally planer outer faces, first through fourth outer surfaces 120, 122, 124 and 126, bounded at their opposed ends by a lower cover wall 106 and an upper cover wall 114. A first cover 102 extends over the lower cover wall 106 (FIG. 4), a third adaptor 112 extends partially over the second cover wall 114, a first adaptor 116 extend spatially over the first outer surface 120 and a second adaptor 118 extends partially over the fourth outer face 124. Each of first cover 102, and first, second and third adaptors 116, 118, 112 are connected the body 104 by a fastening paradigm, here by a plurality of threaded fasteners 128 extending through openings in the corresponding one of the first cover 102, and the first, second and third adaptors 116, 118, 112 and into corresponding threaded apertures provided therefor (not shown) extending inwardly of the first and fourth outer surfaces 120 and 126, and the lower cover wall 106 and an upper cover wall 114.

Figure 4:
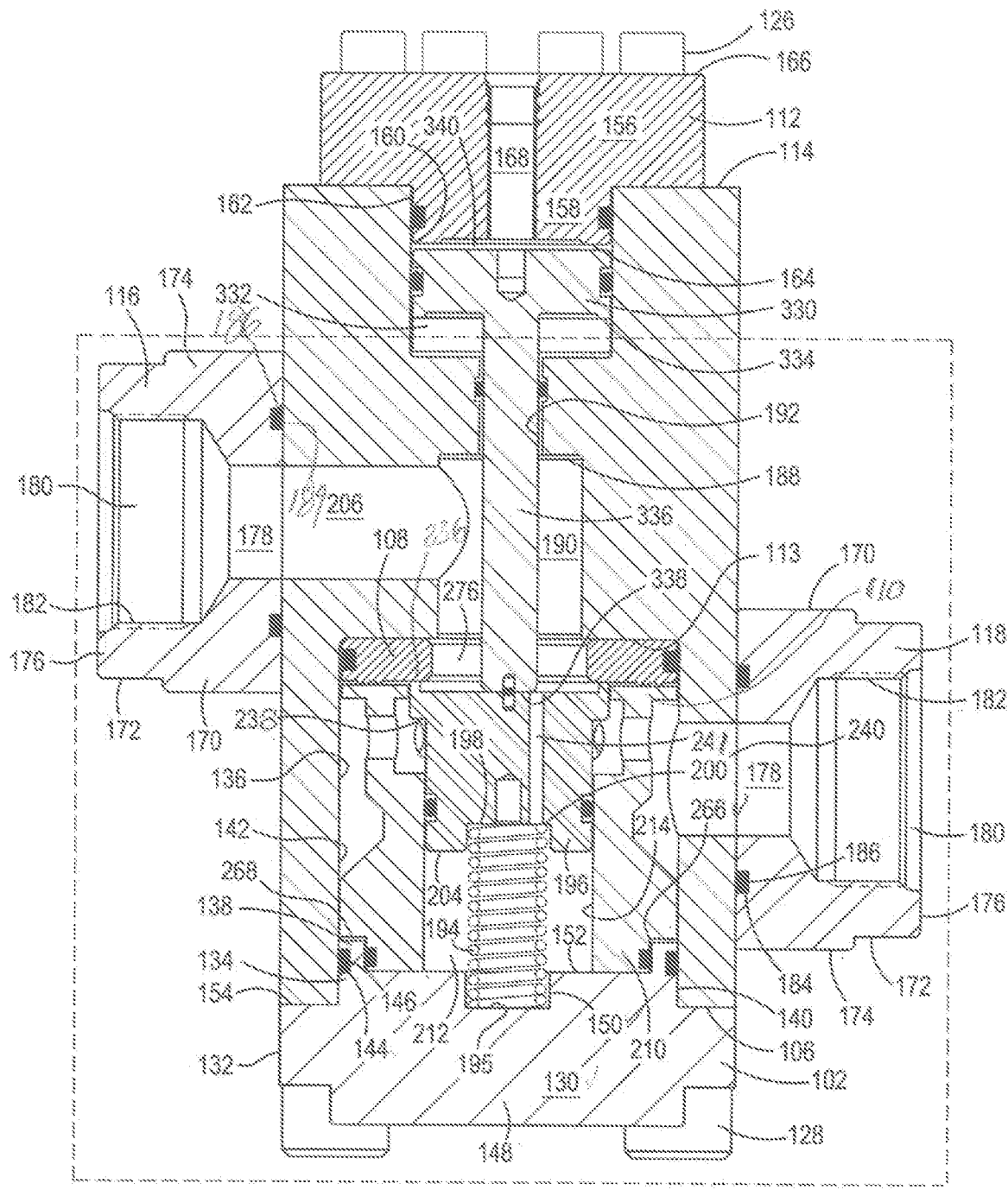
FIG. 4 is a sectional view of the valve of FIG. 3 with the valve in the closed position preventing fluid communication between a first and a second port thereof.

Referring to FIGS. 3 and 4, first cover 102 includes a main body 130 having a generally rectangular perimeter wall 132 having generally the same dimensions as the rectangular, in section, body 104, and first cover boss 134 extending therefrom and inwardly of a counterbore 136 extending inwardly of the cover wall 106 of the body 104. A first annular boss 138 extends from the counterbore facing side of the main body 130 of the first cover 102 adjacent the outer perimeter of the first cover boss 134. The outer circumferential surfaces of the first cover boss 134 and first annular boss 138 together extend as an outer first cover wall 140 of a generally right cylindrical profile and having an outer diameter on the order of 0.003 to 0.005 smaller than the inner diameter of the generally right cylindrical inner counterbore wall 142. An annular circumferential limit wall 154 extends circumferentially around the first cover boss 134 and is engaged against the lower cover wall 106 of the body 104 of the non-gapped check valve 100 with no gap therebetween. A first cover outer seal groove 144 extends inwardly of the outer first cover wall 140 and a first cover seal ring 184 is located therein and is squeezed between the base 146 of the first cover outer seal groove 144 and the facing inner surface of the inner counterbore wall 142. In this first cover 102, a second first cover boss 148 extends from the main body 130 in the direction opposed to the first cover boss 134. A spring bore 150, here configured as a generally right cylindrical blind bore or blind hole, extends inwardly of a first cover loading surface 152 extending within the inner circumference of the first cover boss 138 and generally centered thereon. The first cover 102 also includes a first cover loading surface 152 which is generally circular, and is bounded at its outer circumference by an inner annular guide wall 266 which forms the inner circumferential limit of the first annular boss 138 and the outer circumferential limit of the first cover loading surface 152, and the first annular boss 138 also includes an annular valve inwardly facing surface 268 extending from the terminus of inner annular guide wall 266, distal to the first cover loading surface 152, to the outer first cover wall 140.

The third adaptor 112 includes a third adaptor cover main body 156 having a third adaptor cover boss 158 extending therefrom and into a piston bore 160 extending inwardly of the second cover wall 114 of the body 104. The third adaptor cover boss 158 is a generally right annular member having an third adaptor boss outer circumferential surface 162 having a diameter on the order of 0.003 to 0.006 inches less than the diameter of the piston bore 160 and terminating in a generally circular inwardly facing surface 164. A generally circular outer third adaptor face 166 is located on the third adaptor 112 on the side thereof opposed to the inwardly facing surface 164. An actuator bore 168 extends through the third adaptor 112 with opposed openings thereof generally centered in the inwardly facing surface 164 and the outer third adaptor face 166. As previously described, the third adaptor 112 is connected to the upper cover wall 114 by plurality of threaded fasteners 128 extending through openings (not shown) in the third adaptor 112 and corresponding threaded apertures provided therefor (not shown) extending inwardly of the outer cover wall 114 and body 104.

First and second adaptors 116, 118 here are each configured to receive a threaded nipple therein, and each includes an adaptor body 170 having a generally rectangular outer perimeter and a generally circular, in section, female receiver portion 172 extending therefrom in the direction away from the body 104, a lower rectangular body 174 and an annular outer guide surface 176. A first bore 178 extends inwardly of the lower rectangular body 174, and a second threaded bore 180 having an inner circumferential surface configured with threads 182 fluidly connected to the first bore 178 inwardly of the adaptor body 170. As previously described, the first and second adaptors 116, 118 are connected to their respective first and fourth outer surfaces 120, 126, by a plurality of threaded fasteners 128 extending through openings (not shown) in the adaptor bodies 170 of the first and second adaptors 116, 118 and corresponding threaded apertures provided therefor (not shown) extending inwardly of the respective first and fourth outer surfaces 120, 126 and body 104. An annular seal groove 186 extends inwardly of the base of the lower rectangular body 174 and around the opening of the first bore 178 into the lower rectangular body 174, and a seal ring 184 such as an O-ring is received therein and seals against the base of the annular seal groove 186 and the adjacent corresponding ones of the first and fourth outer surfaces 120, 126 of the body 104.

Body 104 is configured with fluid volumes therein, and with active components which are actuable in response to changes in pressure in at least one of the fluid volumes therein, to change a position or state of the actuable components to enable selective communication between the first bore 178 and the second threaded bore 180 of the first adaptor 116 and the first bore 178 and the second threaded bore 180 of the second adaptor 118. Here, the non-gapped check valve 100 is configured to allow substantially free fluid flow from the first bore 178 to the second bore 180 when the pressure differential therebetween exceeds the cracking pressure of the valve, and block communication between the first bore 178 and the second threaded bore 180 of the first adaptor 116 and the first bore 178 and the second bore 180 of the second adaptor 118 unless the pressure in the first bore 178 and the second bore 180 of the first adaptor 116 exceeds that cracking pressure, for example a pressure difference of 100 p.s.i. Here, the cracking pressure is a function of the difference between the pressures in the first and second bores 178, 180 and the spring constant "k" of a spring 194 tending to push and thus seat the modified seal sleeve 196 against the conforming seat ring 108, such as the position thereof of FIG. 4.

Figure 6:
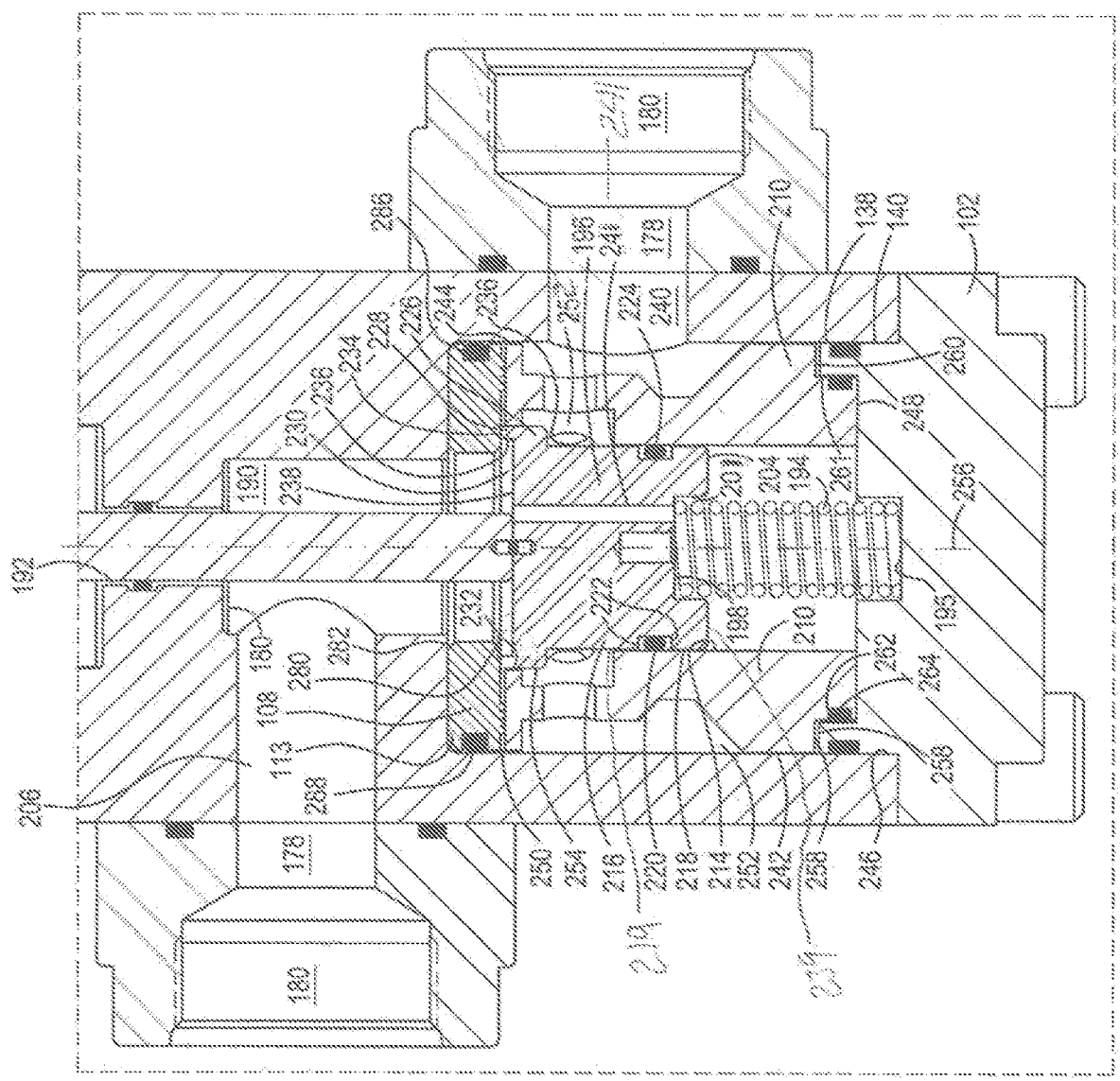
FIG. 6 is an enlarged partial sectional view of the valve of FIG. 3.

Referring to FIGS. 4 and 6, the counterbore 136 extending inwardly of the lower cover wall 106 terminates within the body at an annular seat wall 113 which circumscribes a central flow passage 190 within the body 104, and the central flow passage 190 extends therefrom in the direction of the upper cover wall 114, which in turn terminates at an annular rod ledge 188 circumscribing a rod alignment passage 192 extending from its opening through the annular rod ledge into the piston bore 160 extending inwardly of the upper cover wall 114.

The pressure activated active components include a modified seal sleeve 196, the modified seal sleeve 196 operating as a seal sleeve having a similar function to that of the annular seal sleeve 3 of the valve of FIGS. 1 and 2 herein. The spring 194 includes a lower portion of which bears against the base 195 of the spring bore 150 extending inwardly of the first cover 102 and an upper portion 200 which extends into engagement with the base 198 of a piston spring bore 201 extending inwardly of the first cover loading surface 152 of the lower face 204 of the modified seal sleeve 196, generally centered across the surface thereof. Central flow passage 190 is in fluid communication with the first bore 178 and thus the second bore 180 of the first adaptor 116 through a first cross passage 206 in the body 104 extending therebetween. Similarly, the counterbore 136 is in communication with the first bore 178 and second threaded bore 180 of the second adaptor 118 through a second cross passage 240 in the body 104 extending therebetween. Conforming seat ring 108 is disposed against, and configured to seal against, annular seat wall 113, and the modified seal sleeve 196 is selectively moveable, based on the difference in pressure between the pressures in the first bores 178 and second threaded bores 180 of the first and second adaptors 116, 118 and the spring constant of the spring 194, to either seal against the conforming seat ring 108 and thereby prevent fluid communication between the central flow passage 190 and the counterbore 136 and thus between the first bores 178 and second threaded bores 180 of the first and second adaptors 116, 118, or to move away from the conforming seat ring 108 under the influence of a sufficiently higher pressure in the first bore 178 and second threaded bore 180 of the first adaptor 116 as compared to the pressure in the first bore 178 and second threaded bore 180 of the second adaptor 118 to compress the spring 194 and thereby cause the modified seal sleeve 196 to move away from the conforming seat ring 108. Thus, in use, when the pressure in the first bore 178 of the second adaptor 118 is greater than that in the first bore 178 of the first adaptor 116, the modified seal sleeve 196 seats against an annular region 290 of the facing annular surface of the conforming seat ring 108, thereby preventing flow from the first bore 178 of the second adaptor 118 to the first bore 178 of the first adaptor 116, unless this status is physically overridden, or, the pressure in the first bore 178 of the first adaptor 116 exceeds the pressure in the first bore of the second adaptor 118 by a value sufficient to overcome the force of the spring 194 tending to push the modified seal sleeve 196 seats against an annular region 290 of the facing annular surface of the conforming seat ring 108.

A cage 210 is disposed in the counterbore 136, and includes a central aperture 212 therein extending in the direction between the conforming seat ring 108 and the first cover 102. Cage 210 is configured to provide a cylindrical guide surface 214 surrounding the inner bore thereof, which is configured to allow the modified seal sleeve 196 to move linearly toward and away from the conforming seat ring 108, and guide and align this movement. As shown in FIG. 6, the modified seal sleeve 196 includes a first minor diameter portion 216 having a generally right cylindrical seal sleeve outer surface 219 extending in the direction between the conforming seat ring 108 and the first cover 102, wherein the diameter of the cylindrical seal sleeve outer surface 219 of the minor diameter portion 216 is 0.003 to 0.004 inches smaller than the corresponding diameter of the cylindrical guide surface 214. A minor diameter portion seal groove 220 extends circumferentially around, and inwardly of, the seal sleeve outer surface 219, and includes therein a pair of seal sleeve back up rings 222 and a seal sleeve seal ring 224 interposed between the seal sleeve back up rings 222, and contacting both the base of the minor diameter portion seal groove 220 and the cylindrical guide surface 214 to seal the space between the minor diameter portion seal groove 220 and the cylindrical guide surface 214 to prevent fluid flow there past or therethrough. Modified seal sleeve 196 further includes a seal sleeve major diameter portion 226 extending integrally from the first minor diameter portion 216 as an integral extension thereof and in the direction of the conforming seat ring 108. Seal sleeve major diameter portion includes an annular extending portion 228 extending integrally from the first minor diameter portion 216 as an integral extension thereof in the direction of the conforming seat ring 108 terminating in an annular seal face 234, which surrounds a central recess 230. The outer surface of the annular extending portion 228 includes an outer cylindrical seal sleeve major diameter outer wall 232, and a connecting ledge 236 connects the outer cylindrical seal sleeve major diameter outer wall 232 and the seal sleeve outer surface 219. The central recess 230 includes a central recess surface 238, and a flow balance passage 241 opens thereinto and extends through the body of the modified seal sleeve 196 to open through the base 198 of lower piston spring bore 201 of the modified seal sleeve 196.

Cage 210 is configured to guide the modified seal sleeve 196 to be generally centered along the centerline 256 of the cage 210 during movement thereof toward and away from conforming seat ring 108, to prevent the modified seal sleeve 196 from cocking, or having its longitudinal axis greatly deviate from that of centerline 256, as it moves. Cage 210 includes a first outer cage surface 242 disposed adjacent to the first cover 102 having a diameter on the order of 0.003 to 0.004 inches less than the corresponding inner circumferential surface 246 of the counterbore 136, and a second outer cage surface 244 disposed adjacent to the conforming seat ring 108 and having a diameter on the order of 0.003 to 0.004 inches less than the corresponding inner circumferential surface 246 of the counterbore 136, a cage lower annular surface 248 facing the first cover 102, a cage upper annular surface 250 facing, and contacting, the conforming seat ring 108, an annular recess 252 extending inwardly of and between the first and second outer cage surfaces 242, 244, and an upper guide surface 254 having an inner diameter on the order of 0.003 to 0.004 inches greater than that of the outer cylindrical seal sleeve major diameter outer wall 232.

Additionally, cage 210 includes a circumferential recess 258 extending inwardly of the lower annular surface 248 and the first outer cage surface 242 thereof. Circumferential recess has a lower annular wall 260 extending inwardly of the cage 210 and facing the first cover 102 and terminating at a circumferential pilot wall 261 extending therefrom to the lower annular surface 248 of the cage 210. A circumferential seal gland 262 extends inwardly of the pilot wall 261 generally midway between the lower annular wall 260 and the lower annular surface 248 of the cage 210. A seal ring 264, for example an O-ring, is received in the circumferential seal gland 262, and seals against the base of the circumferential seal gland 262 and the inner annular guide wall 266 of the first annular boss 138 to seal off fluid flow and communication in any gap between the inner annular guide wall 266 of the first annular boss 138 and the pilot wall 261.

Figure 7:
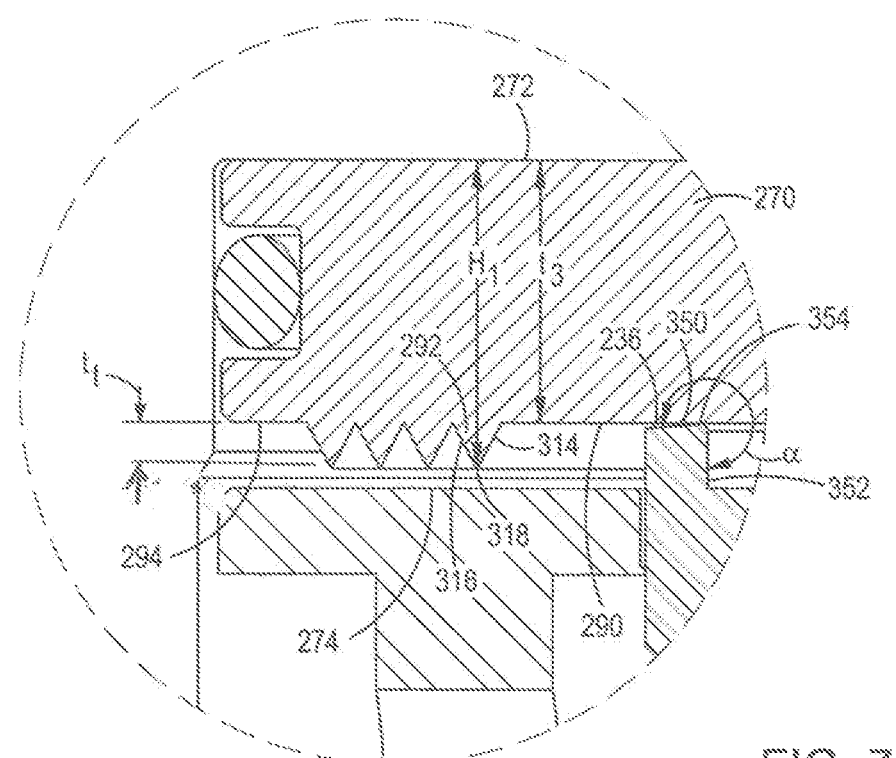
FIG. 7 is a partial sectional view of the seat ring of FIG. 5 installed in the valve of FIG. 3, showing projections thereof in a free or uncompressed state.
Figure 8:
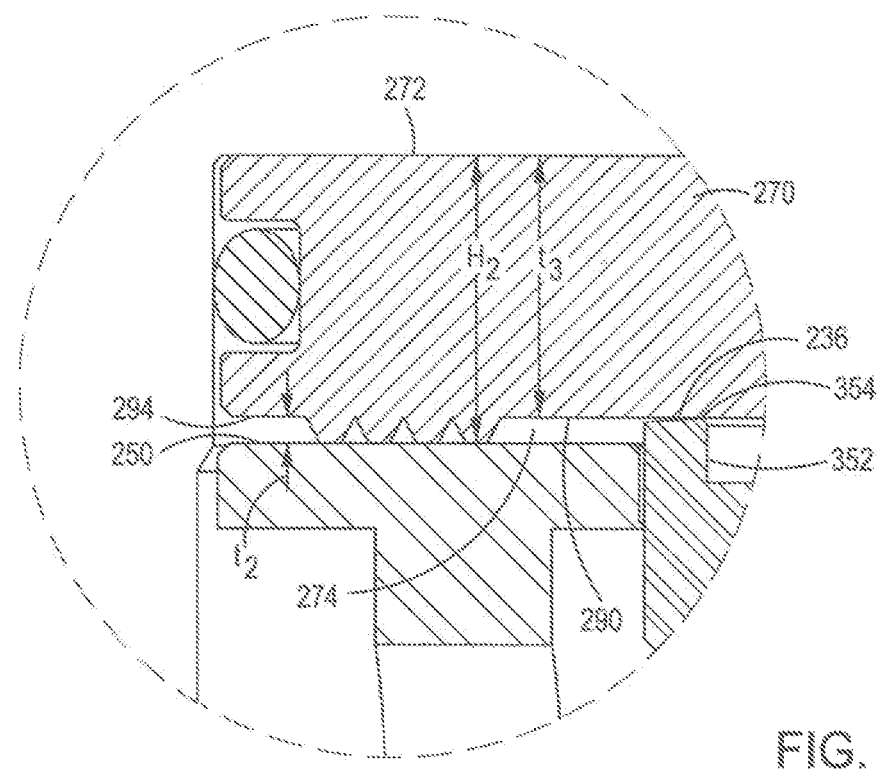
FIG. 8 is a partial sectional view of the seat ring of FIG. 5 installed in the valve of FIG. 3, showing projections thereof in a compressed state.

As best shown in FIGS. 5, 7 and 8, conforming seat ring 108 has an annular ring shaped body 270, including a first annular face 272, here facing the annular seat wall 113 of the valve body 104, an opposed second annular face 274 here facing the cage upper annular surface 250, the second annular face 274 having a series of the projections 110 extending therefrom and which extend outwardly from an inner annular region 290 of the second annular face 274. Ring shaped body 270 further includes an inner, generally circular, opening 276 therethrough having an inner circumferential wall 278 terminating at its opposed sides (first and second annular faces 272, 274) at opposed first and second frustoconical faces 280, 281 (FIG. 6) and an outer circumferential wall 282. Outer circumferential wall includes a circumferential gland 286 extending thereinto, within which a conforming seat ring outer seal 288 (FIG. 6) is positioned to seal between the base of the circumferential gland 286 and the inner counterbore wall 142 to prevent fluid leakage or fluid communication in any gap between the inner counterbore wall 142 and the outer circumferential wall 282 of the conforming seat ring 108.

Here, the second annular face 274 of the conforming seat ring 108 includes the inner annular region 290 presenting as a generally flat or planar annular region extending radially outwardly of the intersection thereof with the first frustoconical face 280, an outer annular region 294 presenting as a generally flat or planar annular region extending radially inwardly of the outer circumferential wall 282, and an annular intermediate region 294, from which the projections 110 project, extending therebetween. Here, inner annular region 290 and outer annular region 294 are generally coplanar when the conforming seat ring 108 is in a free state, i.e., when the conforming seat ring 108 is in an unbiased or un-squeezed state prior to the conforming seat ring 108 being pressed by the cage 210 against annular seat wall 113.

Figure 10:
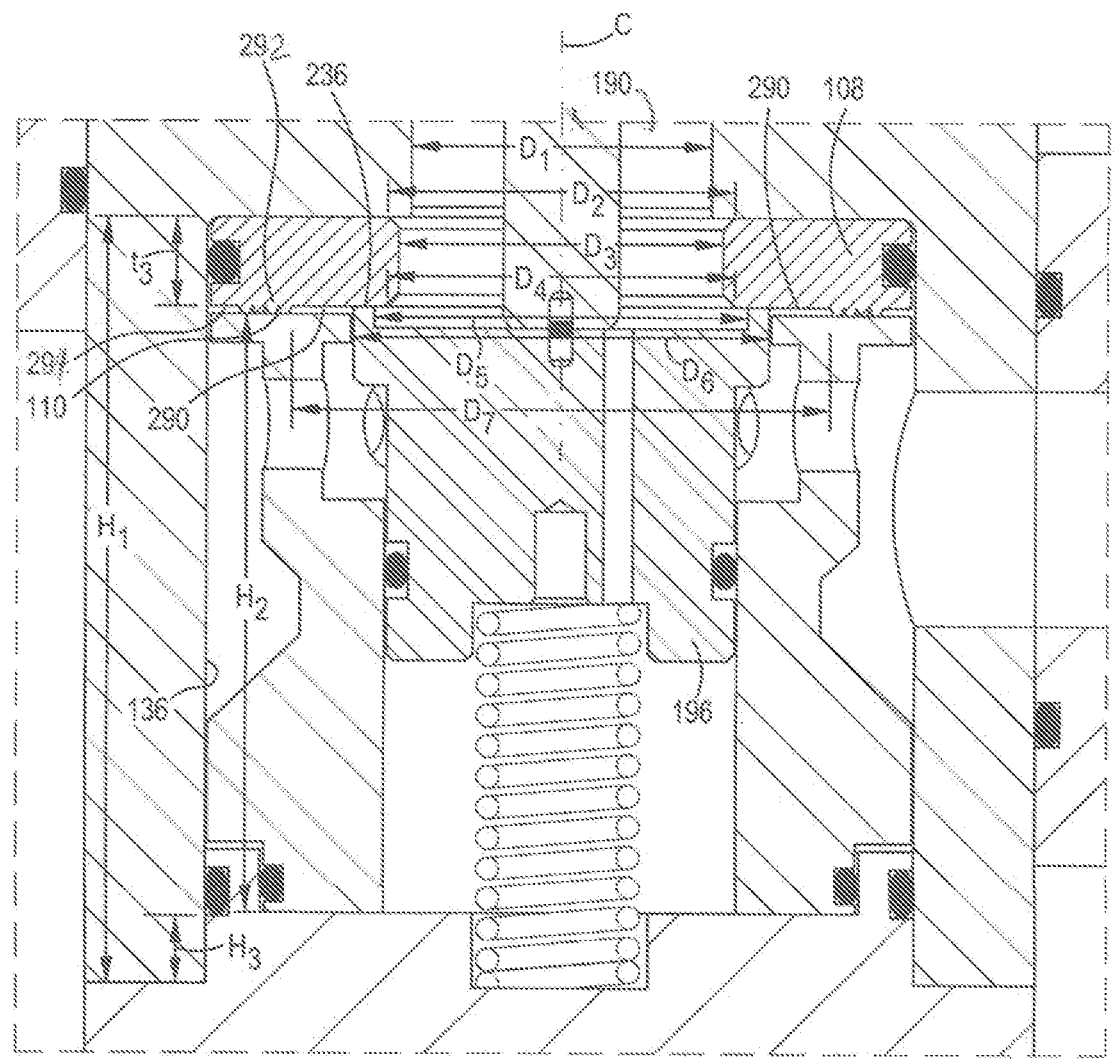
FIG. 10 is a partial sectional view for describing the interaction of the sizes of the valve internal components.

The inner annular region 290, outer annular region 294 and intermediate annular region 292 of the conforming seal sleeve 196 are located, and sized, with respect to the cage 210 and the modified seal sleeve 196, to ensure that the projections 110 contact the cage upper annular surface 250, and the connecting ledge 236 of the modified seal sleeve 196 can contact only the inner annular region 290 of conforming seat ring 108. Thus, as shown in FIG. 10 the central flow passage 190 here is a generally circular in cross-section passage having a diameter $D_1$, first frustoconical surface 280 has a maximum diameter, at the intersection thereof with inner annular region 290, of $D_2$ which is greater than diameter $D_1$, inner circumferential wall 278 has a diameter $D_3$ which is greater than $D_1$ but less than $D_2$, and the inner annular region 290 extends from diameter $D_4$ which is generally equal to diameter $D_2$ to diameter $D_7$, at which diameter the intermediate annular region 292 begins. Connecting ledge 236 has an inner diameter $D_5$ greater than both diameter $D_4$ and diameter $D_1$ and an outer diameter $D_6$ greater than inner diameter $D_5$ and less than diameter $D_7$, all diameters $D_1$ to $D_7$ are centered on centerline C of the conforming seat ring 108. As a result, when modified seal sleeve 196 is biased against conforming seat ring 108, it will inherently contact the inner annular region 290 thereof, and thus not come into contact with the projections 110 of the intermediate region 292. Additionally, the inner diameter of the upper guide surface 254 of the cage 210 is slightly larger than the outer diameter $D_6$ of the connecting ledge 236, and it extends outwardly therefrom to approximately the same diameter as the outer diameter of the conforming seat ring 108, thereby ensuring that at least a portion of the cage upper annular surface 250 faces the projections 110 of the intermediate annular region 292 of the conforming seat ring 108.

Here, the projections 110 extend as integral extensions from the conforming seat ring 108, and here include four annular projections 300-306, each of the four annular projections 300-306 having an annular base 308 and four arcuate projections 310 extending integrally therefrom in the direction further away from the annular surfaces 290, 294. Thus the first annular projection 300 extends circumferentially at a first projection circumference from the centerline C, and it includes an annular base 308 and four arcuate projections 310 extending therefrom and equally spaced about the first circumference from the center C. The second annular projection 302 extends circumferentially about a second projection circumference about the centerline C greater than the first projection circumference, and it also includes an annular base 308 and four arcuate projections 310 equally spaced from one another along the second projection circumference from the center C. The third annular projection 304 likewise includes an annular base 308 and four arcuate projections 310 extending therefrom and equally spaced from one another along a third projection circumference about the centerline C greater than the second projection circumference, and the fourth annular projection 306 includes and annular base 308 and four arcuate projections 310 extending therefrom and equally spaced from one another along a fourth projection circumference about the centerline C greater than the third projection circumference.

Between each of the arcuate projections 310 (here four) at each of the first to fourth projection diameters is a relief gap 312, and in the aspect of the conforming seat ring 108 of FIG. 5, these gaps are radially aligned with one another along a radius extending from the centerline C of the conforming seat ring 108. Here, for reference, the first through fourth projection circumferences may be considered to be at the radial center of each of the first through fourth annular projections 300-306, respectively. Each of the first to fourth annular projections 300 to 306 has, in a free state, where the projections 110 are not compressed or squeezed inwardly toward the main bulk of the body of the conforming seat ring 108, a thickness $t_1$ as shown in FIG. 7, and in a maximum compressed state of the projections they have a thickness $t_2$ as shown in FIG. 8. Additionally, as shown in FIG. 10, the conforming seat ring 108, not including the thickness of the projections 110 (300 to 306), has a thickness $t_3$ between the inner and outer annular surfaces 290, 294 and the first annular face 272 thereof, and this thickness $t_3$ remains relatively constant between the free, i.e., uncompressed or un-squeezed state of the conforming seat ring 108 before it is installed in the non-gapped check valve 100, and the thickness of $t_3$ valve-installed state of the conforming seat ring 108. Each of the arcuate projections 110 (300 to 306) in this aspect of the conforming seat ring 108 has a saw tooth or triangular profile in section (across a radius of the modified seat ring 108 centered at centerline C), with opposed sidewalls 314, 316 extending along opposed radial sides of each of the first through fourth annular projections 110 (300-306) and meeting at a peak 318, the length of each peak 318 defining an arc extending along the aforementioned one of the first through fourth projection circumferences. Although the projections 110 (300-306) here are shown as four annular projections 110 (300-306), each having four arcuate projections 310 equally circumferentially spaced along the circumference of the respective firth through fourth projection circumference which they extend, with radially aligned relief gaps 312 therebetween, other numbers of annular projections 310, other relief gap 312 arrangements, for example relief gaps 312 along different ones of the first through fourth projection circumferences that are not radially aligned across the projections 110, other arcuate projection 310 profiles such as semi-circular or truncated cone in section, or other ellipsoid or geometric shapes of the arcuate projections 310 are specifically contemplated herein. Furthermore, the relief gas 312 may have different circumferential lengths in different ones of the projections 110 (300-306). Additionally, although the projections 110 (300-306) are centered about the centerline C of the circular, in plan view, conforming seat ring 108, they may have a different center offset from the location of the center C of the circular, in plan view, conforming seat ring 108, or each of the projections 110 (300-306) may extend around different centers at least one of which may be the same, or different than, the centerline C of the circular, in plan view, conforming seat ring 108. Additionally, the projections 110 (300 to 306) here are shown as following a circular circumferential path, although they may trace other paths along the cage 210 facing side of the conforming seat ring 108.

As discussed herein with respect to FIG. 2, where the seat ring 11 has a generally planar surface over its radius and circumference facing the cage 210, the dimensional tolerance stack of the cage 210, the counterbore of the valve body, and the seal ring are such that a purposefully created tolerance stack gap 18a is required to ensure that at certain tolerance limits of these elements, there remains no free space within the valve body between the cage 210 and the seat ring 11. Here, the conforming seat ring 108, which is manufactured of a relatively stiff, but deformable material which does not break down in the presence of the hydraulic fluid in the valve, for example a material such as PEEK or Delrin® 511P, includes the four annular projections 300-306 that can be compressed, despite having the same material construct as the adjacent portions of the main body of the conforming seat ring 108, and they thus serve to ensure that the cage 210 loads against the conforming seat ring 108 such that the first annular face 272 of the conforming seat ring 108 is pressed against and contacts the second annular face 274 of the body 104 when the annular cover wall 106 of the body 104 contacts the circumferential limit wall 154 of the first cover 102, over the entire tolerance range of the dimensions of the conforming seat ring 108, first cover 102 and cage 210. As a result, the tolerance stack gap 18a, and the resultant corrosion and failure issues attendant with the valve of FIGS. 1 and 2, is eliminated. This is provided by sizing the difference between the free state thickness $t_1$ and the maximum compressed thickness $t_2$ of the projections 110 (300-306) to be greater than, or equal to, the maximum difference in the tolerance stack of the conforming seat ring 108, first cover 102 and cage 210. As a result, when the non-gapped check valve 100 is properly assembled, the annular cover wall 106 of the body 104 can, and always will, contact the circumferential limit wall 154 of the first cover 102 thereby preventing exposure of these surfaces to an ambient corrosive environment and the eventual stress corrosion cracking experienced in the structure of FIGS. 1 and 2. Additionally, the total height of the conforming seat ring 108 of $H_1$, including the free non compressed height $t_1$ of the projections, is sized such that the lower cover wall 106 of the body 104 is spaced from the surface of the second cover main body 156 extending around the cover boss 158 over the entire range of dimensional tolerance of the components of the valve when the cage 210 biases the conforming seat ring 108 in contact therewith against the annular seat wall 113 before the first cover 102 is secured against the wall 106, and, at the maximum compressed height H2 of the conforming seat ring 108 after the lower cover wall 106 of the body 104 is in contact with the surface of the second cover main body 156 extending around the cover boss 158 the cage 210 is biased against the conforming seat ring 108 and the conforming seat ring 108 is biased against the annular seat wall 113 so that the conforming seat ring 108 is not free to move within the non-gapped check valve 100.

By way of example, assuming the counterbore 136 has a depth from the lower cover wall 106 to the annular seat wall 113 of a depth of 0.50 inches, with a tolerance of +/−(plus or minus) 0.0025 inches, the cage 210 has a height from the cage lower annular surface 248 facing the first cover 102 to the cage upper annular surface facing of 0.350 inches with a tolerance of +/−0.0025 inches, the distance between the first cover loading surface 152 and the annular valve inwardly facing surface 268 of the cover has a dimension of 0.100 inches with a tolerance of +/−0.0025 inches, and the conforming seat ring 108 thickness, including the projections, is $t_1+t_3$ of 0.090, with a tolerance of +/−0.0025 inches. In this case, the maximum stack distance of the dimensions is the sum of the maximum tolerance dimension of the cage 210 of 0.350+0.0025, the maximum tolerance dimension of the height of the inwardly facing surface 268 of 0.100+ 0.0025, and the maximum tolerance dimension of the conforming seat ring 108 thickness ($t_1+t_3$), 0.090+0.0025, which equals 0.5475 inches. The minimum stack distance of the dimensions $H_2$, $H_3$ and $t_3$ is the sum of the corresponding minimum tolerance dimensions of the cage 210 of 0.350-0.0025, the minimum tolerance dimension of the height of the inwardly facing surface 268 of 0.100-0.0025, and the minimum tolerance dimension of the thickness of the conforming seat ring 108 ($t_1+t_3$) of 0.090-0.0025 tolerance, which equals 0.5325 inches. Thus, the maximum depth of the counterbore 136 must be less than, or equal to, the minimum stack distance of here 0.5325 inches. To ensure that the conforming seat ring 108 is firmly secured between the cage 210 and the annular seat wall 113 before the threaded fasteners 128 extending through openings in the first cover 102 are tightened into the corresponding threaded apertures provided therefor (not shown) extending inwardly of the lower cover wall 106, the maximum depth of the counterbore is slightly less than the minimum stack distance to leave an indicator gap between the lower cover wall 106 and the circumferential limit wall 154 of the first cover before assembly as a visual indicator to the valve assembler that the cage 210 is contacting the conforming seat ring 108 and the conforming seat ring 108 is contacting the annular seat wall 113 before the threaded fasteners 128 extending through openings in the first cover 102 are tightened into the corresponding threaded apertures provided therefor (not shown) extending inwardly of the lower cover wall 106. The projections 110 are compressible in the direction of the second annular surface of the conforming seat ring 108, for example on the order of 0.015 to 0.025 inches of compression. For example, the maximum depth of the counterbore is, for the minimum stack distance of 0.5325 inches, for example 0.520 inches.

Assuming the tolerance of the depth of the counterbore 136 is +1-0.0025 inches, the minimum depth of the counterbore 136 is 0.5025 inches. Thus, where the maximum stack distance of is present, in this example 0.5475 inches, the projections 110 must be capable of compressing (being compressed) by an amount equal to the difference between the counterbore 136 minimum depth of 0.5475 inches and the maximum stack distance of 0.5475 inches.

Relief gaps 312 are provided in the projections 110 to allow air or other fluid to escape from between the arcuate projections 110 (300-306) on adjacent ones of the first to fourth projections 300-306 as the threaded fasteners 128 extending through openings in the first cover 102 are tightened into the corresponding threaded apertures provided therefor (not shown) extending inwardly of the lower cover wall 106 and the volume between the adjacent ones of the projections and the facing surface of the cage 210 is thereby reduced.

Referring again to FIG. 4, non-gapped check valve 100 here also includes an override system, here including a pilot piston 330 reciprocally moveable in the piston bore 160 extending inwardly of the upper cover wall 106, and including an override rod 336 extending from an annular piston surface 334 facing inwardly of the override piston bore 332, through the rod alignment passage 192 to contact the central recess surface 238 of the modified seal sleeve 196 at the rod end 338. The actuator bore 168 through the third adaptor 112 communicates with the back side 340 of the pilot piston 330 within the piston bore 160.

In operation, when the non-gapped check valve 100 is functioning as a pressure relief valve, when the pressure in the first cross passage 206 in the body 104 is at a monitored line pressure below the cracking pressure and the first adaptor 116 is connected to a monitored line (not shown), the force of the spring 194 and the pressure force of the fluid pressure bearing against the lower face 202 of the modified seal sleeve 196, as well as the force of the fluid pressure bearing against the annular connecting ledge 236 together exceed the pressure force exerted by the pressure in the first cross passage 206 communicating with the central recess surface 238 of the modified seal sleeve 196 communicated thereto through the central flow passage 190 and the opening 276 in the conforming seat ring 108, the modified seal sleeve 196 will maintain the position thereof shown in FIG. 4, wherein the connecting ledge 236 thereof contacts the conforming seat ring 108 on the inner annular region 290 thereof. As shown in FIGS. 7 and 8, connecting ledge 236 is a generally frustoconical surface, having a generally flat surface 350 extending at an angle α of greater than 270 and less than 280 degrees, from the adjacent inner annular surface 352 of the annular extending portion 228 of the modified seal sleeve 196, resulting in a circumferential edge 354 which initially engages the inner annular region 290 of the conforming seat ring 108 in line contact, and allows the generally flat surface 350 adjacent to the circumferential edge 354 to push inwardly of the inner annular region 290 of the conforming seat ring 108 to seal off fluid communication between the first cross passage 206 fluidly connected to the monitored fluid line when the second cross passage 240 is exposed different pressure ambient or different pressure line, for example to the ambient pressure conditions the valve and the first bore 178 in the second adaptor 118 is functioning as a vent. This is possible because during steady state pressure conditions in the first cross passage 206, the pressure against the lower face 204 of the modified seal sleeve 196 is equal to the pressure in the first cross passage 206 as communicated through the flow balance passage 241.

Figure 9:
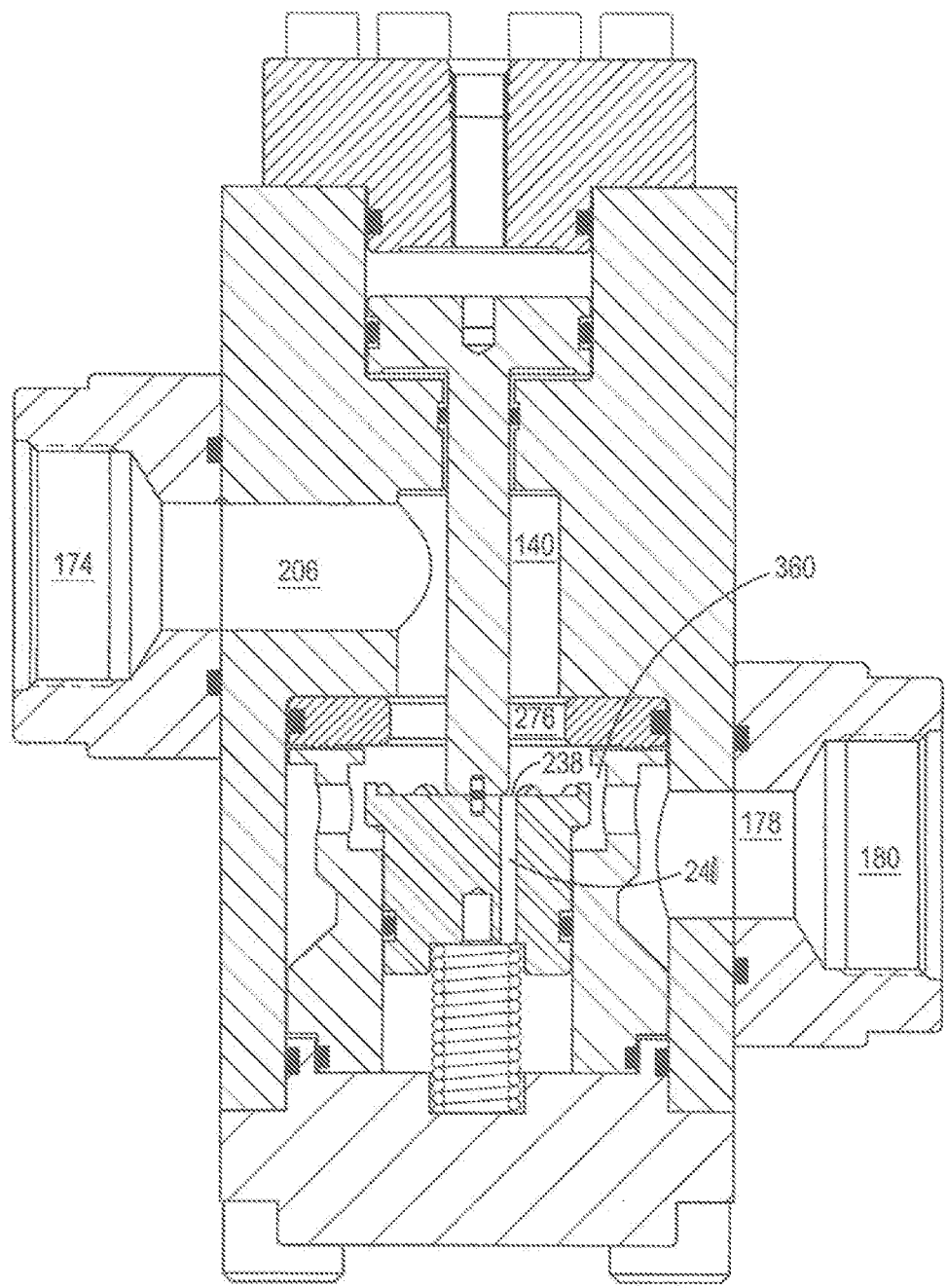
FIG. 9 is a sectional view of the valve of FIG. 3 with the valve in the open position allowing fluid communication between the first and the second port thereof.

If the pressure in the first cross passage 206 in the body 104 changes to a monitored line pressure above the regulated pressure, the force of the spring 194 and the pressure force of the fluid pressure bearing against the lower face 202 of the modified seal sleeve 196, as well as the force of the pressure bearing against the annular connecting ledge 236 together will not exceed the pressure force exerted by the pressure in the first cross passage 206 communicating with the central recess surface 238 of the modified seal sleeve 196 communicated thereto through the central flow passage 190 and the opening 276 in the conforming seat ring 108, and the modified seal sleeve 196 will move in the direction of the position thereof shown in FIG. 9 and an annular relief gap 360 allows fluid communication between the first cross passage 206 and the second cross passage 240 exposed to a lower pressure ambient or low pressure line, allowing the overpressure condition in the monitored fluid line to vent. Once the pressure is reduced by a sufficient amount, such that the pressure in the first cross passage 206 communicating with the central recess surface 238 of the modified seal sleeve 196 communicated thereto through the central flow passage 190 and the opening 276 in the conforming seat ring 108 is insufficient to overcome the force of the spring 194 and the pressure force of the fluid pressure bearing against the lower face 202 of the modified seal sleeve 196, as well as the force of the pressure bearing against the annular connecting ledge 236 together, the modified seal sleeve 196 will move back to the position thereof in FIG. 4.

Modified seal sleeve 196 here, in normal operating conditions, i.e., where an overpressure condition is not present in first cross passage 206, is in a pressure balanced state, as the flow balance passage 241 allows fluid communication, and equal pressure, on both the seal sleeve lower surface 239 and central recess surface 238. However, when a rapid spike in pressure occurs in the monitored fluid line, the flow balance passage 241 has an insufficient cross section to allow this pressure to rapidly communicate to the seal sleeve lower surface 239, and the modified seal sleeve 196 will move to vent the overpressure condition.

In the event the valve operation needs to be overridden, a force sufficient to push the pilot piston 330 in the direction of the modified seal sleeve 196 causes the rod end 328 to push the modified seal sleeve 196 away from the conforming seat ring 108 and thereby form the annular relief gap 360 (FIG. 9) to allow pressure and fluid communication between the valve. This can be accomplished by an adequate fluid pressure supplied through the actuator bore to move the pilot piston 330 toward the modified seal sleeve 196, or by a mechanical pin extending from an actuator, such as a solenoid, configured to contact the back side 340 of the pilot piston 330 and thereby move the pilot piston 330 toward the modified seal sleeve 196.

Thus, the non-gapped check valve 100 can be operated in an override condition, to cause the pressures in the first cross passage 206 and the second cross passage 240 to be equalized independently of the pressures therein prior to movement of the rod end 328 to push the modified seal sleeve 196 away from the conforming seat ring 108 and thereby form the annular relief gap 360.

What is claimed is:

1. A valve, comprising:
   a valve body including a first fluid port opening from the valve body, a second fluid port opening from the valve body, and an interior passage fluidly connecting the first fluid port and the second fluid port;
   a bore extending inwardly of a first wall of the valve body and having an annular first seat securement surface extending around an interior passage intermediate of the first fluid port and the second fluid port, the second fluid port fluidly connected to the bore;
   a cage disposed in the bore, the cage having an annular second seat securement surface having an inner circumferential surface having a first diameter defining the outer wall of a cage bore extending inwardly of the bore from the annular second seat securement surface and an opposed first annular surface, the annular second seat securement surface facing the annular first seat securement surface;
   a cover extending over the first wall of the valve body and the opening of the bore thereof, the cover including a cage engagement surface contacting the first annular surface; and
   an annular seat having a main body having an opening therethrough and a first annular seat surface facing and contacting the annular first seat securement surface of the valve body and a second annular seat surface, facing away from the first annular seat surface, the second annular seat surface comprising a first annular region having a flat annular sealing surface at a first elevation and extending radially inwardly of the first diameter of the inner circumferential surface of the annular second seat securement surface of the cage and a second annular region different than the first annular region and disposed about the first annular region, and the second annular region comprises at least one projection projecting from the annular seat to an elevation greater than the first elevation and contacting the annular second seat securement surface, the at least one projection extending circumferentially around the opening in the annular seat and including a first portion having a second elevation and a second portion having a third elevation different than the second elevation, and the first portion is circumferentially aligned with the second portion;
   and a seal sleeve reciprocally received within the cage, the sealing sleeve terminating, at a first end thereof, in an annular sleeve sealing surface, the annular sealing surface selectively engageable with the first annular region of the second annular seat surface and not engageable with the second annular region of the second annular seat surface.

2. The valve of claim 1, wherein the at least one projection further includes a third portion circumferentially aligned with the first portion and the second portion and having the second elevation, and the first portion and the third portion extend circumferentially from opposed sides of the second portion in the circumferential direction.

3. The valve of claim 2, wherein the at least one projection includes at least a first projection having the first, second and third portions aligned with one another circumferentially, with the second portion circumferentially between the first and second portions and a second projection radially spaced from the first projection and also having the first, second and third portions aligned with one another circumferentially, with the second portion circumferentially between the first and second portions.

4. The valve of claim 3, wherein the second portion of the first projection is aligned radially with the second portion of the second projection.

5. The valve of claim 4, wherein the first and second projections are triangular in section having a tip extending distal the first annular surface.

6. The valve of claim 1, further including a seal sleeve disposed within the cage between the cage engagement surface of the cover and the annular seat.

7. The valve of claim 6, wherein the seal sleeve comprises an annular projecting portion extending from a surface thereof facing away from the cage engagement surface of the cover.

8. The valve of claim 7, wherein the first annular region of the annular seat is interposed between the opening of the annular seat and the second annular region of the annular seat.

9. The valve of claim 1, wherein the bore has a maximum depth from the first wall of the valve body to the annular first seat securement surface of $H_1+$ and a minimum depth from the first wall of the valve body to the annular first seat securement surface of $H_1-$;
   the cage has a maximum height between the annular second seat securement surface and the opposed first annular surface of $H_2+$ and a minimum height between the annular second seat securement surface and the opposed first annular surface of $H_2-$;
   the annular seat has a maximum thickness $t_3+$ between the first annular seat surface and the first annular region of the second annular seat surface and a minimum thickness $t_3-$ between the first annular seat surface and the first annular region of the second annular seat surface; and
   the at least one projection in an uncompressed state has a maximum elevation height of $t_1+$ above the first annular surface, and a minimum elevation height of $t_1-$ above the first annular surface, wherein;

$$H_1+ \leq (H_2-+H_2-+t_1-).$$

10. The valve of claim 9, wherein $H_1- \leq (H_2+H_2+t_1)$, and the at least one projection is compressible inwardly of the main body of the annular seat by at least a difference between $H_1-$ and a sum of $(H_2++H_2++t_1+)$.

* * * * *